United States Patent [19]

August

[11] Patent Number: 4,751,902
[45] Date of Patent: Jun. 21, 1988

[54] PROCEDURE AND DEVICE FOR THE INTRODUCTION OF A LAYER CHARGE FOR OTTO MOTORS

[76] Inventor: Paul August, C/Ballester 43, Barcelona, Spain

[21] Appl. No.: 844,924

[22] Filed: Mar. 17, 1986

[30] Foreign Application Priority Data

Dec. 20, 1985 [DE] Fed. Rep. of Germany ....... 3545440

[51] Int. Cl.$^4$ .............................................. F02B 31/00
[52] U.S. Cl. ..................................... 123/263; 123/308
[58] Field of Search ............... 123/263, 279, 308, 432, 123/430

FOREIGN PATENT DOCUMENTS

| | | |
|---|---|---|
| 2514416 | 10/1976 | Fed. Rep. of Germany . |
| 2741121 | 3/1979 | Fed. Rep. of Germany . |
| 2950830 | 6/1981 | Fed. Rep. of Germany . |
| 1520960 | 3/1968 | France . |
| 2360754 | 3/1978 | France . |
| 55-123312 | 9/1980 | Japan . |
| 371852 | 4/1982 | United Kingdom . |

OTHER PUBLICATIONS

Yamaguchi, "Light Weight Super-Economy Engine Adopts Three-Valve Combustion Chamber", Automotive Engineering, Jan. 1985, vol. 93, No. 1, pp. 79-82.

*Primary Examiner*—E. Rollins Cross
*Attorney, Agent, or Firm*—Thomas S. MacDonald; Alan H. MacPherson; Paul J. Winters

[57] ABSTRACT

PROCEDURE AND DEVICE FOR THE INTRODUCTION OF A LAYER CHARGE FOR OTTO MOTORS

BACKGROUND OF THE INVENTION

The invention concerns a procedure and a device for the introduction of a layer charge for Otto motors, in which a richer air fuel mixture is located in the area of the spark plug, and a weaker air-fuel mixture is located in the remaining areas.

The layer charging of Otto motors enables operation with a very weak mixture. In this way consumption figures comparable to those of a diesel engine in conjunction with low carbon monoxide, hydrocarbon and nitrogen emissions are achieved.

The real problem of layer charging is to ensure that the ignition sequence is correctly achieved, despite the face that a prevailing mixture of greater than Lambda 1.3 is in the cylinder. The weaker the prevailling mixture is, the less harmful the content of the exhaust.

The technical problem of the invention is to provide a procedure for the ignition of this weaker mixture so that despite a relatively extreme weak mixture efficient combustion is achieved.

The solution of the problem in accordance with the invention consists of leading the richer mixture under pressure to the spark plug.

This procedure applies a completely new method. Previously the charging of the weak mixture was only achieved by the intake pressure; therefore, one needed relatively large amounts of rich mixture to achieve an efficient ignition sequence.

BRIEF SUMMARY OF THE INVENTION

In the current invention, general protection is claimed for leading a richer mixture under pressure to a spark plug, and the invention is independent from whatever measures are used on the piston head and on the corresponding cylinder wall in order to achieve this pressure, which is naturally higher than the available compression pressure.

The heart of the present invention is, therefore, that the richer mixture is precisely directed to the spark plug like a nozzle-type accelerated jet, and that the weaker mixture in the combustion chamber is not immediately brought into contact with the richer mixture by this precisely directed jet but the ignition is first introduced to the richer mixture. This resulting ignition jet then achieves a mixing and combustion of the weaker mixture.

In a first embodiment of the present invention, it is provided that the richer mixture is precisely directed to the spark plug by at least one "squish" space in which it is essential that the richer mixture is accelerated into the combustion chamber, jet-style, and hits the spark plug in the opposite side of the combustion chamber, during which time the weaker mixture is introduced into the combustion chamber by other valves outside the "squish" space. In this way it is ensured that the spark plug is at first only hit by the richer mixture which guarantees an unusually good and thorough combustion of this mixture. The ensuing ignition jet is used to achieve combustion of the weaker mixture in the combustion chamber, which by virtue of initial ignition by the ignition jet burns thoroughly leaving practically no waste products.

A further embodiment of the present invention provides for a further improvement of the directional effect of the richer mixture onto the spark plug which is achieved in that the "squish" space already available in accordance with the first embodiment is extended in the direction of the spark plug into the combustion chamber reaching into the intermediate space between the valves arranged in the cylinder head wall above.

In this way the "squish" space length in the direction of the spark plug is greatly increased and therefore a further acceleration and an improvement of the directional effect of the richer mixture onto the spark plug is achieved.

In one embodiment of a device constructed according to the invention, it is preferred that the combustion chamber consists on one side of a trough-shaped recess formed in the piston head and corresponding rounded-off surfaces of the cylinder head. On the other side of the combustion chamber a "squish" space is constructed, formed on one side by a surface of the piston head and on the other side by a corresponding surface of the cylinder head, so that the first "squish" space opens into the combustion chamber and there, depending on the direction of this "squish" space, either creates merely a laminar, non-rotating "squish" space flow or, if it concerns a "squish" space directed against the upper cylinder head wall, creates a first rotating vortex, in which approximately coaxial to the first "squish" space and in extension of the first "squish" space, the second "squish" space between the piston head and the corresponding surface of the cylinder head is constructed, and a second vortex flow is created which is directed onto the spark plug.

Therefore, seen over the width of the combustion chamber, a first "squish" space is arranged which ensures that a richer mixture is introduced into the combustion chamber through a first inlet valve, and a first vortex flow is created therein. Co-axially relative to this first inlet valve a further "squish" space is arranged, likewise approximately central to the piston head, which lengthens the first "squish" space, in which this "squish" space creates a second vortex flow which is precisely directed onto the spark plug.

In the case of the first embodiment in which the first "squish" space is directed towards the cylinder head wall, one can visualize—seen over the width—that laterally outwards, two slower-rotating vortices are formed, which are created by the first, wider "squish" space. These two outer vortices are separated from each other, in the middle, by a faster rotating concentric vortex. The faster rotation of this middle vortex is achieved because the central "squish" space is arranged as an extension of the wider "squish" space, and therefore its "squish" space flow already enters the mouth of this second "squish" space at a higher initial speed and is further sharply accelerated by it so that it creates the already described concentric faster-rotating vortex which is precisely directed onto the spark plug.

In this way the spark plug immediately receives a relatively rich mixture which leads to an immediate and certain ignition in the form of an ignition jet which is introduced into the combustion chamber in such a way that it enters the combustion chamber approximately parallel to the rotating vortices thus amplifying the rotational effect. The central, fast-rotating vortices which now contain the ignition jet, continue rapidly sideways into the lateral outer vortices, which are unusually quickly and surely burned through by the diverging ignition jet, so that, in toto, an efficient combustion of the mixture rotating in the combustion chamber is ensured.

It has been found that one can now efficiently carry out the combustion sequence at much reduced nitrogen and carbon monoxide levels of the exhaust because the combustion is very intensive by means of the rich mixture led in under pressure.

Naturally, all other possibilities of introducing a rich mixture under pressure to the spark plugs are included in the invention. In the preferred embodiment the use of a "squish" space appeared to be the simplest solution.

Examples having an adjacent chamber for the rich mixture did not achieve the desired results. As a result of the combustion chamber being full of fissures, the hydrocarbon content of the exhaust was high and the consumption did not correspond to expectations.

Layer charging in a combustion chamber with a specifically directed injection, for example the Proco-Motor by Ford, achieved no satisfying results, during continually variable revolutions and loading areas despite very long development times. In addition this system is complicated and expensive.

Further features of the invention are the subject of the remaining sub-claims.

The subject of the present invention is defined by the Patent Claims individually and in combination.

The invention is further explained by means of drawings illustrating one embodiment. Further features and advantages essential to the invention arise out of the drawings and their descriptions.

DETAILED DESCRIPTION

Figure 1:
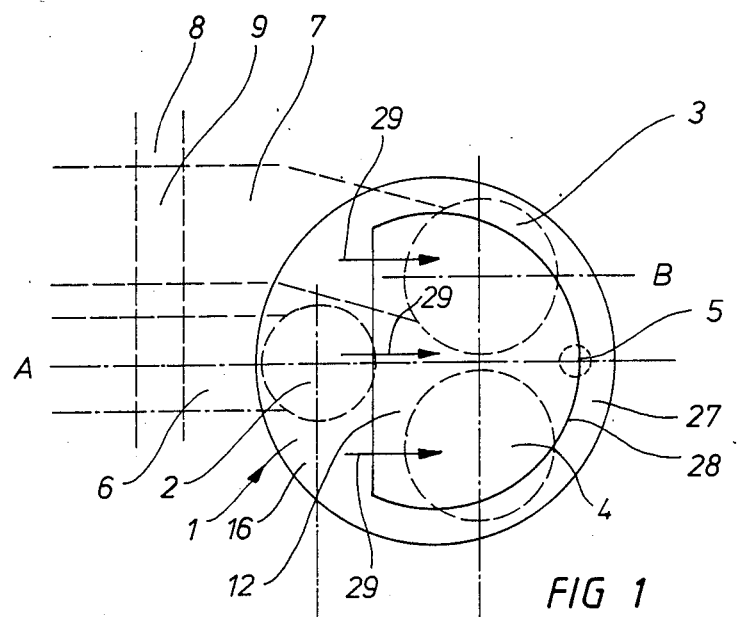
FIG. 1 is a plan view of the piston head of a piston with a combustion chamber in accordance with the invention showing the position of the valves and inlet duct arranged in the cylinder head above by dotted lines, in a first embodiment with a first, long "squish" space.
Figure 2:
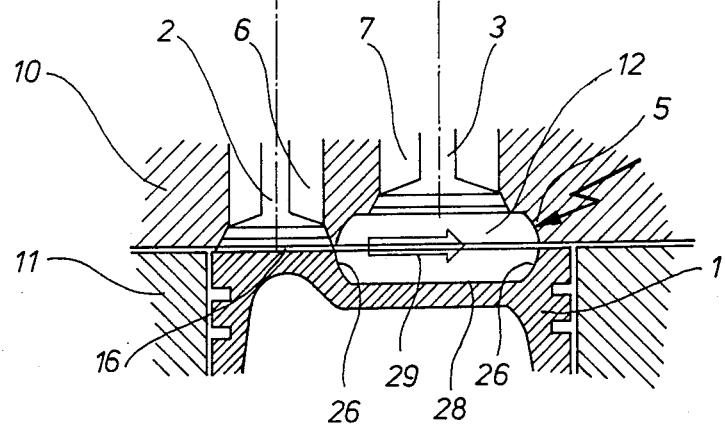
FIG. 2 is a section on the line A–B in FIG. 1.
Figure 4:
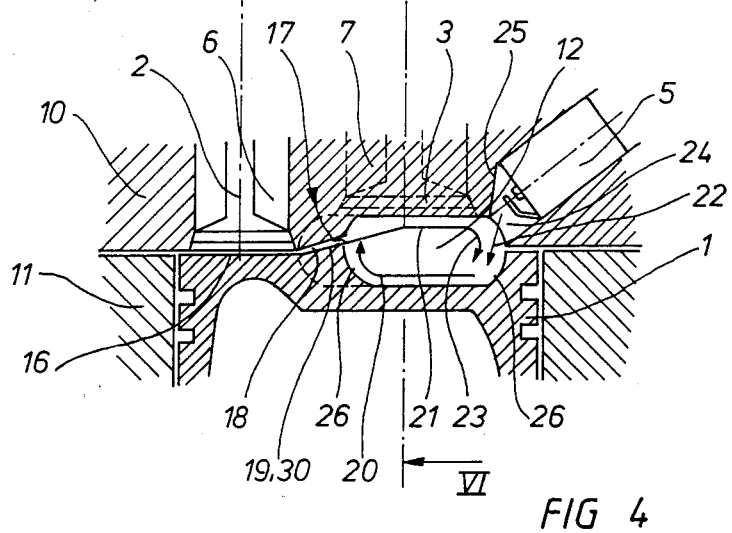
FIG. 4 is a section on line A–B in FIG. 3.
Figure 5:
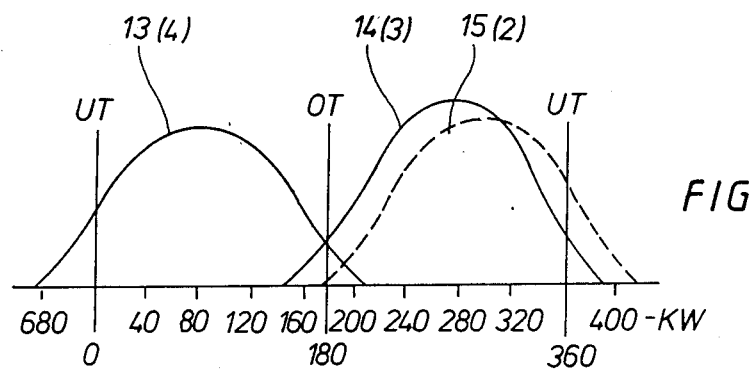
FIG. 5 is a graph of the valve opening times of the three valves.

A piston (1) runs in a cylinder (11) which in the illustration in FIGS. 2 and 4 is shown in its top dead-centre position. The cylinder (11) is covered on top by a cylinder head (10) in which, in accordance with FIG. 1, three valves (2) (3) (4) are arranged. Valves (2) and (3) are arranged as inlet valves, and valve (4) is arranged as an outlet valve. The inlet valve (3) recieves its mixture through the inlet duct (7) whereas inlet valve (2) receives its mixture through inlet duct (6).

The outlet of the outlet valve (4) is not illustrated for reasons of clarity.

The combustion chamber (12) illustrated in FIGS. 1 to 4 is formed between the piston head (27) and the corresponding surfaces of the cylinder head (10). The same parts are indexed with the same index numbers throughout the drawings.

In the piston head (27), on one side a trough-shaped recess (28) is machined, which together with the corresponding surfaces of the cylinder head above appears as a somewhat rounded profile as shown in FIG. 2.

In the trough-shaped recess (28) corresponding guide curves (26) are machined. Similar guide curves are located in the part of the cylinder head above the trough-shaped recess (28).

In FIGS. 1 and 2 a first embodiment is illustrated which shows how a richer mixture can be led under pressure to the spark plug (5) located opposite the inlet valve (2). The piston head (27) in this instance forms "squish" space (16) which extends approximately over the width of the combustion chamber (12). The "squish" space here is formed from a level surface of the piston head (27) in conjunction with an opposite level surface in the cylinder head (10). The inlet valve (2) for the intake of the richer mixture is arranged in the area of this "squish" space (16).

In FIG. 2 the inlet valve (2) has closed again and the richer mixture has already been projected into combustion chamber (12) through the "squish" space (16) in the form of a "squish" space flow which is almost straight. This "squish" space flow (29) hits the spark plug (5) and thus subsequently introduces ignition. The ignition jet (22) arising in the richer mixture (Ref. FIG. 4) then serves advance the rotation in this area and to completely burn through the weaker mixture in the combustion chamber.

Within the scope of the present invention the "squish" space (16) is also arranged obliquely, and in the form of a wedge-shaped combustion chamber directs its "squish" space flow (18) directly onto the opposingly-arranged spark plug (5).

Figure 3:
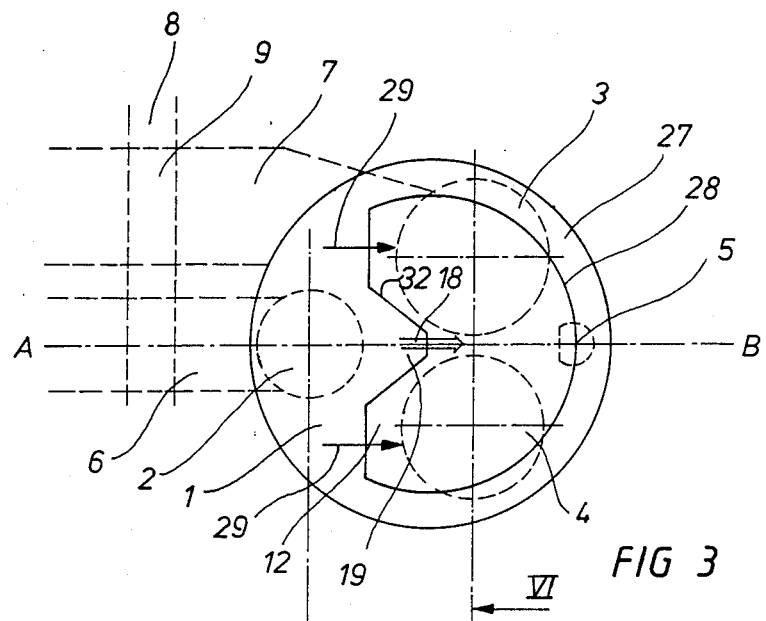
FIG. 3 is a plan view of the piston head of a piston with a combustion chamber in accordance with the invention with dotted lines showing the valves and inlet duct in the cylinder head above, and with a lengthened "squish" space and a series-connected central "squish" space.

The embodiment in FIGS. 3 and 4 differs from the embodiment in FIGS. 1 and 2 in that behind the first "squish" space (16) a further, central "squish" space (19) is provided.

Figure 6:
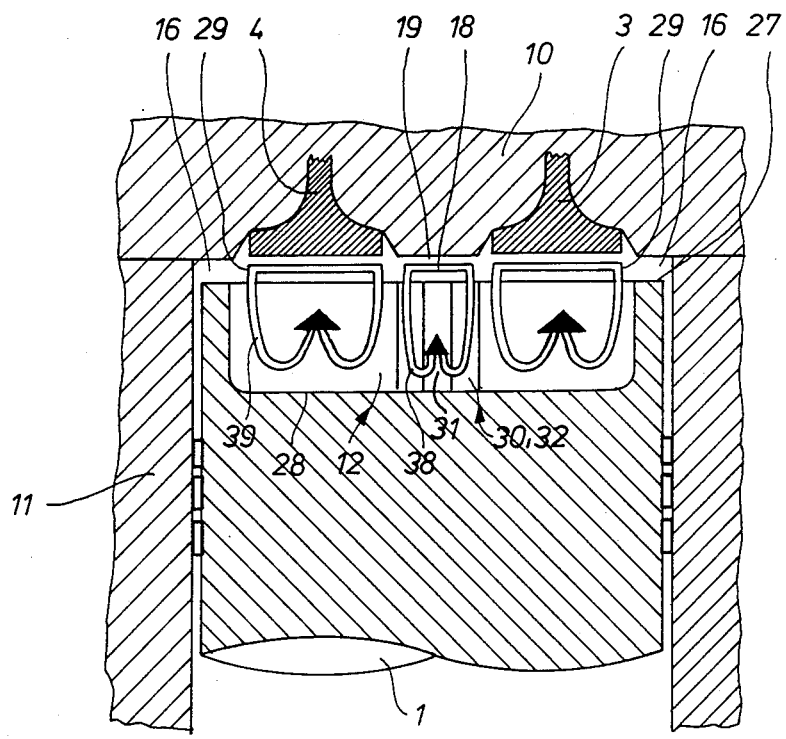
FIG. 6 is a section on the line V1—V1 in FIG. 4 through the combustion chamber.

On the left side of FIG. 4, the first "squish" space (16) is formed again in the piston head (27, FIG. 3) which consists on one side of a level surface of the piston head (27), which acts together with the corresponding level surface of the wall of the cylinder head (10) above it. The "squish" space (16) extends mainly over the complete width of the combustion chamber, as in the first embodiment of FIG. 3, in which the "squish" space flow (29) emerging from this "squish" space is directed straight into the combustion chamber (12) and does not create any outer flow vortices (39, FIG. 6). In this second embodiment only the centre "squish" space creates a central flow vortex (38, FIG. 6). Also in this embodiment the "squish" space (16) is obliquely directed against the underside of the valves (3) (4) and the "squish" space flow (29) exiting therefrom is diverted onto the corresponding curved surfaces of the wall of the cylinder head (10) and onto the corresponding guide curve (26) of the recess (28) in the piston head, so that a diverted flow vortex (39) (Ref. FIG. 6) of the mixture (23) is achieved in the direction of arrow (21).

As shown in FIGS. 4 and 6, the flow vortex (39) is also diverted onto the floor of the recess (28) in the direction of arrow (20), so that by means of the wider "squish" space (16) a flow vortex (39) is achieved over the complete width of the combustion chamber.

Corresponding to the illustration in FIGS. 3 and 6 the wide "squish" space (16) is extended in the middle by a further "squish" space (19) in which this "squish" space extends into the intermediate space between the valves (3) (4) in the cylinder head (10) above. The "squish" space (19) is therefore an extension of the wider "squish" space (16) behind it, and recieves from "squish" space (16) the mixture at a relatively high initial speed. A further acceleration arises here in the direction of arrow (17) (Ref. FIG. 4) and the central "squish" space flow (18) (Ref. FIGS. 4 & 6) created by this "squish" space (19) enters the combustion chamber (12) at a higher speed than that of the other "squish" space flow (29) created by "squish" space (16). A faster-rotating flow vortex (38) is therefore created approximately in the centre of the combustion chamber, which is precisely directed to the oppositely-arranged spark plug (5) in the cylinder head (10). In this way, because the central "squish" space projects far into the combustion chamber (12), the volume of the combustion chamber at this point and the distance between the mount of "squish" space (19) and the spark plug (5) is advantageously reduced which contributes to a further acceleration of the "squish" space flow (18).

At the beginning of the induction stroke the inlet valve (3) opens through which pure combustible gas, possibly with the addition of exhaust gas or very weak mixture, is drawn in. The inlet valve (2) opens next, through which richer mixture is drawn in either from a carburettor or an injector.

Thus, the motor receives in the lower part of the combustion chamber pure combustible gas or a very weak mixture and later receives a mixture of combustible gas or weak mixture with richer mixture. In the upper part of the cylinder charge the cylinder (11) receives only richer mixture through the opened inlet valve (2) during which time the inlet valve (3) is already closed. Through the opened inlet valve (2) the richer mixture is then first pre-accelerated by the first "squish" space (16) in order to receive its high final acceleration from the second "squish" space (19) and then to enter the combustion chamber in the form of a highly-accelerated "squish" space flow (18) to hit the opposingly-located spark plug (5). As the central "squish" space (19) is located as an extension of the approximately co-axially arranged inlet valve (2), the richer mixture is therefore violently accelerated by both the series of arranged "squish" spaces (16) (19) and arrives, as specified, in the combustion chamber in the form of a violently-accelerated "squish" space flow (18) which is thus fully ignited. The ignition jet (22) created herewith is introduced, in a preferred embodiment, approximately parallel to the flow vortices (38) (39) rotating in the combustion chamber (12) so that a further violent acceleration of the flow vortices (38) (39) arises, and simultaneously the ignition jet reaches into the laterally-flowing "squish" space flows (29) and/or the laterally rotating vortices (39) through the rapidly-rotating vortex (38) in the middle, and in this way leads to a sure combustion of these "squish" space flows (29) and/or vortices (39).

It is preferred here that the spark plug (5) is arranged in a chamber (24) recessed away from the combustion chamber (12) into the cylinder head (10), and that the chamber (24) has an oblique edge (25) of such a shape that the ignition jet, as described above, enters the combustion chamber (12) approximately parallel to the flow vortices (38) (39).

In accordance with the embodiment in FIG. 4, the middle "squish" space (19) is formed as a "squish" projection (30), which, as illustrated in FIGS. 3 and 6 is somewhat wedge-shaped in plan view and extends into the intermediate space between the valves (3) (4) arranged above it. The "squish" projection has a leading, approximately flat, front face (31) onto which join wedge shaped side faces (32), tapered towards the rear. It is important here that the middle "squish" space (19) is extended as far as possible in the direction of the spark plug (5) in order to lead a straight and directed short flow of the richer mixture directly onto the spark plug (5).

To further simplify the formation of weaker and richer mixtures, the complete mixture only is created by a carburettor or injection equipment and is weakened by the addition of combustible air before the valve (3) at the position (9). This additional air can be led in by an adaptor (8) between the inlet chamber and the cylinder head. Control is achieved by a throttle flap or similar valve which is linked to the control of the opening of the carburettor throttle flap. At tick-over of this engine the throttle flap for the additional air is closed. Instead of pure combustible air, exhaust gas or a mixture of exhaust and combustible air can be substituted.

Because of the imprecise separation of the layer charge in which the richer mixture and combustible air in the zone of disturbance during induction and compression phases experience a transitional mixing, a thorough combustion of all fuel parts is ensured. This achieves, in the case of excess air which is not combustible without layer charging, a very low consumption at minimal carbon monoxide, hydrocarbon and nitrogen emissions. It can be driven at a total mixture composition of Lambda 1.5 or more, in which a readily combustible mixture Lambda 0.8 to 1.0 is located in the area of the spark plug.

The low consumption and the very low values of all toxic parts in the exhaust gas can only be achieved when the combustion takes place in a non-fissured combustion chamber as in the case of this invention.

Following modifications to existing motors are to be made:

1. Both valves (2) (3) have separate inlet ducts (6) (7) to which are led a richer mixture supplied through inlet duct (6), and a weaker mixture or pure combustible air supplied through inlet duct (7).

2. The opening times of both valves are not the same. The valve (3) is, as usual, controlled by normal opening and closing times, approximately 40° before TDC to 50° after BDC or closed earlier in accordance with curve 14. The control graph for outlet valve (4) is shown by curve 13.

The inlet valve (2) opens later, approximately 20°-40° and closes later than the other inlet valve (3) (refer to curve 15).

All the previously described embodiments are outstanding in that one half of the combustion chamber is located in a trough-shaped recess in the piston head and the other half is located in the cylinder head. Within the scope of the invention, additional specific protection is claimed for the fact that the combustion chamber is mainly located in the upper cylinder head. This means that the recess in the piston head is dispensed with and the piston head is formed flat in this area and forms together with the right "squish" space an essentially continuous plane.

What I claim is:

1. Procedure for the introduction of a layer charge for an Otto motor having three valves, a combustion chamber and a spark plug in operable position to said chamber, comprising directing a rich mixture of a charge into said chamber at an area of the spark plug position, and directing a relatively weaker mixture of a charge into a remaining area of said chamber and wherein one of the three valves is fed with the rich mixture, which rich mixture is directed subsequent to exiting from said one valve in a stream under pressure to the spark plug (5).

2. Procedure according to claim 1, characterized in that the directing of the rich mixture to the spark plug (5) occurs by rotating the rich mixture in the combustion chamber (12).

3. Procedure according to claims 1 or 2, characterized in that the rich mixture is directed under pressure to the spark plug (5) and creates, together with an ignition jet (22) formed by ignition of said rich mixture, a rotation of the rich mixture in the combustion chamber.

4. Procedure according to claim 1, wherein a phased layer charging is made with timed separation of the directing of said relatively weaker mixture and the directing of the rich mixture.

5. A method of charging an Otto-type combustion motor having a piston head, a cylinder head, a combustion chamber formed between said heads, two inlet valves and an outlet valve in said piston head, and a spark plug juxtaposed to a top portion of said chamber, said method comprising:

providing a rich fuel-air mixture exiting from one of said inlet valves into said chamber;

providing a relatively leaner fuel-air mixture or combustible air exiting from the other of said inlet valves into said chamber;

accelerating a portion of said rich mixture from said one of said inlet valves directly toward said spark plug, other portions of said rich mixture forming vortices within said chamber;

directing an ignition jet resultant from combustion of said rich mixture adjacent said spark plug into said rich mixture vortices to ignite said rich mixture vortices; and flowing said leaner mixture or combustible air into said chamber for ignition by said ignited rich mixture.

6. In an internal combustion engine having a cylinder, a piston reciprocally disposed in said cylinder, a cylinder head secured over said cylinder, a piston head facing said cylinder head and forming a combustion chamber therebetween, two inlet valves and an outlet valve in said cylinder head, and a spark plug juxtaposed to said combustion chamber, the improvement comprising:

said combustion chamber having a trough-like recess, corresponding facing surfaces of said cylinder head and said piston head forming a first "squish" space adjacent a first side of said recess;

one of said inlet valves being a rich air-fuel mixture inlet valve in said cylinder head and having an outlet extending into said "squish" space;

said spark plug being positioned at a position on a second side of said recess opposite said first side of said recess such that rich air-fuel mixture from said "squish" space is directed across said recess directly to said spark plug; and the other of said inlet valves being a weak air-fuel mixture or combustible air valve in said cylinder head and having an outlet above said recess for directing said weak air-fuel mixture or combustible air to said recess.

7. The engine according to claim 6 wherein said first "squish" space includes lateral compression gaps, said lateral compression gaps forming rotating vortices of said rich mixture, and said rotating vortices and said weak air fuel mixture or combustible air being ignitable by an ignition jet from said spark plug.

8. The engine according to claim 6, including a second "squish" space (19) comprising an approximately wedge-shaped "squish" projection (30) arranged on said piston head (27) and which extends into the trough-shaped recess (28) in the piston head (27) so that it reaches into an intermediate space defined by the other of said inlet valves and said outlet valve arranged in the cylinder head (10).

9. The engine according to claim 8, wherein a "squish" space flow created by the second "squish" space (19) is obliquely directed against the underside of the cylinder head (10).

10. The engine according to claim 6, wherein a portion of said rich air-fuel mixture forms first and second flow vortices (38) (39) rotating in said recess and wherein the spark plug (5) is located at such an angle to the first and second flow vortices (38) (39) rotating in the combustion chamber (12) that an ignition jet (22) enters the combustion chamber (12) almost parallel to the first and second flow vortices (38) (39).

11. The engine according to claim 10, wherein the spark plug (5) is arranged in a recessed chamber (24) in the cylinder head (10) and the chamber (24) is directed at such an angle that the ignition jet (22) emerging from the chamber (24) enters the combustion chamber almost parallel to the first and second flow vortices (38) (39).

12. The engine according to claim 6, wherein said other inlet valve (3) for combustible air or week mixture is controlled with normal opening times, whereas the one inlet valve (2) opens later and closes either at the same crank angle or a little later than the other inlet valve (3).

13. The engine according to claim 6, wherein the other inlet valve (3) closes earlier than usual and earlier than the one inlet valve (2).

* * * * *